UNITED STATES PATENT OFFICE.

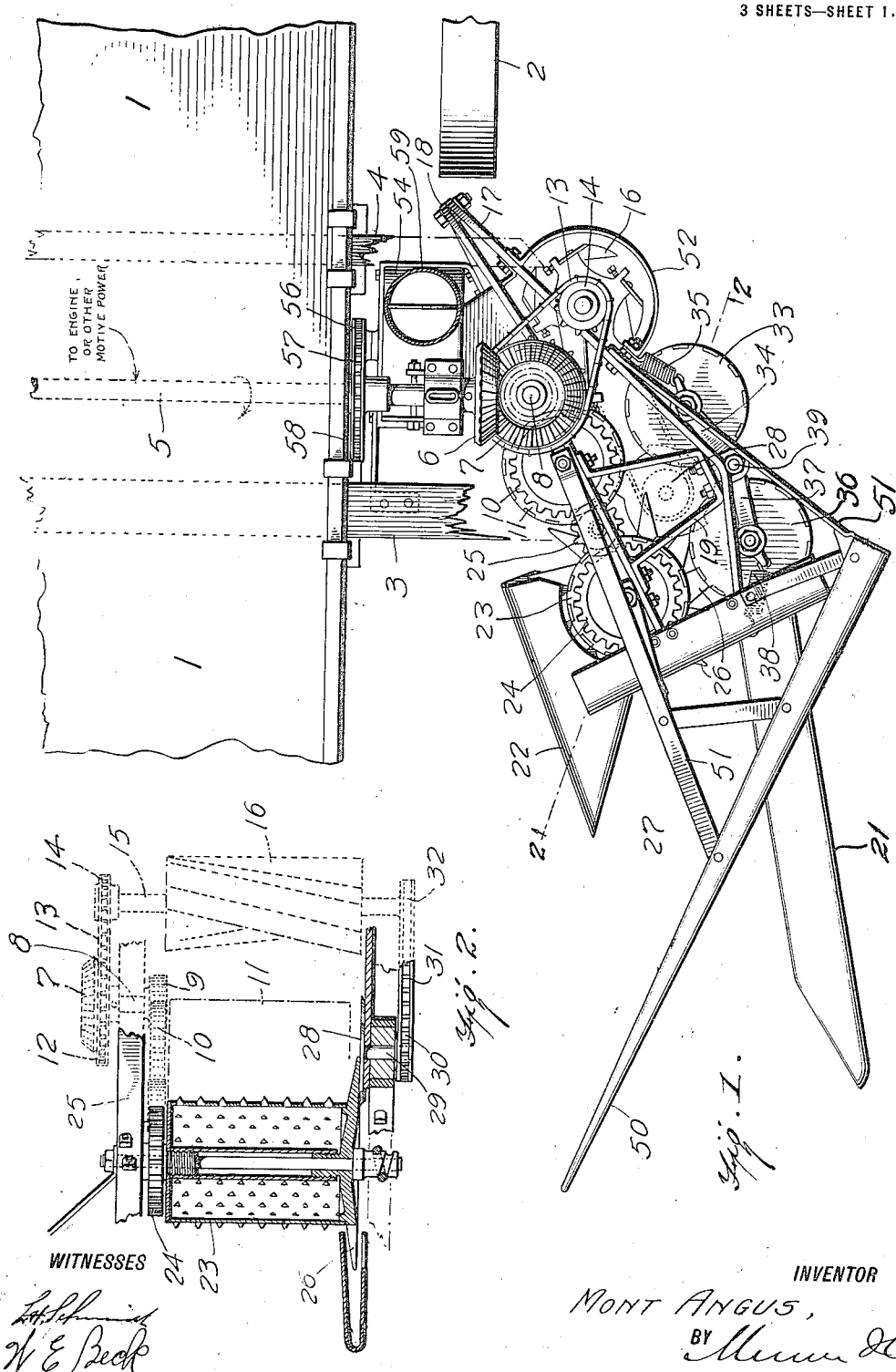

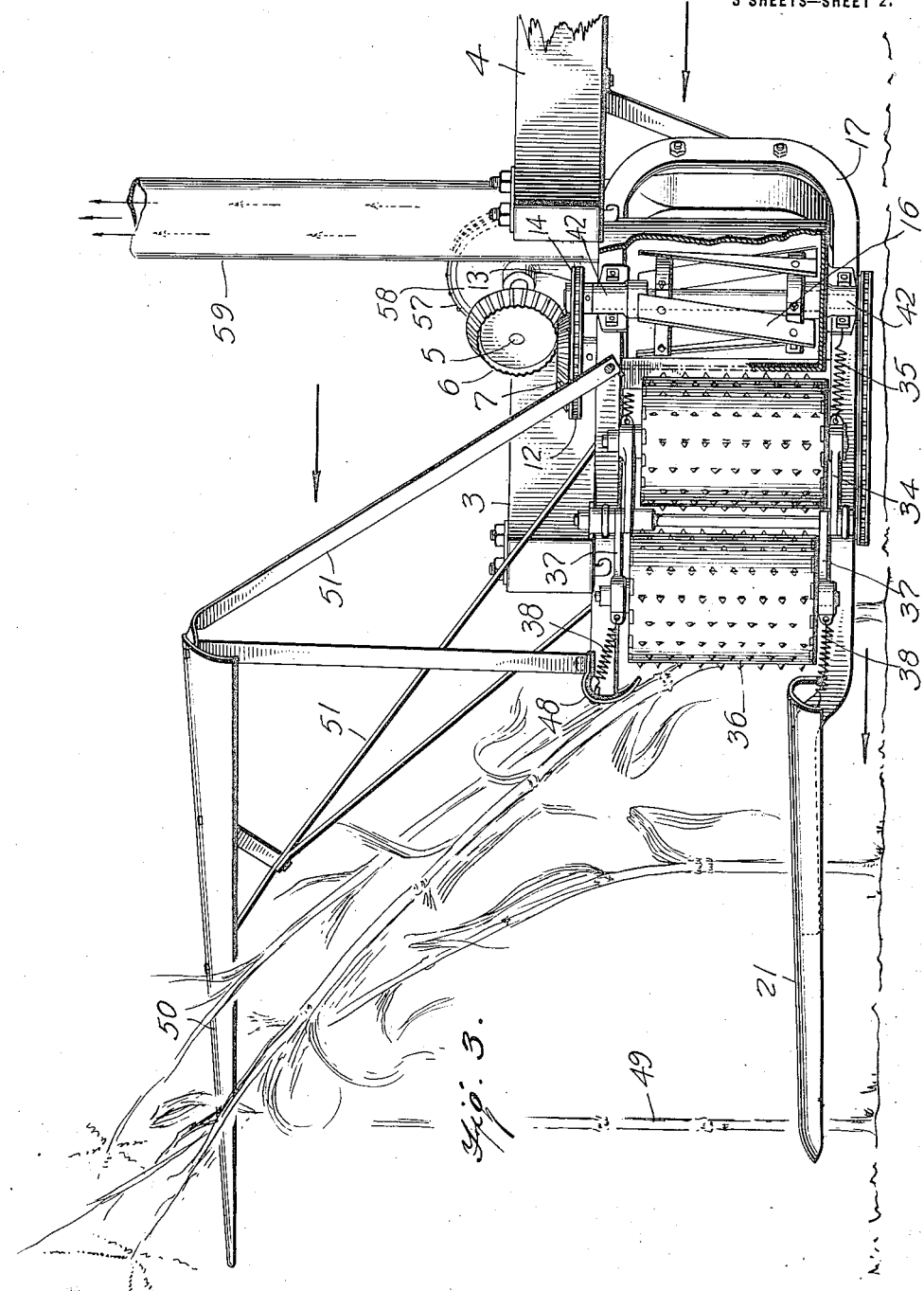

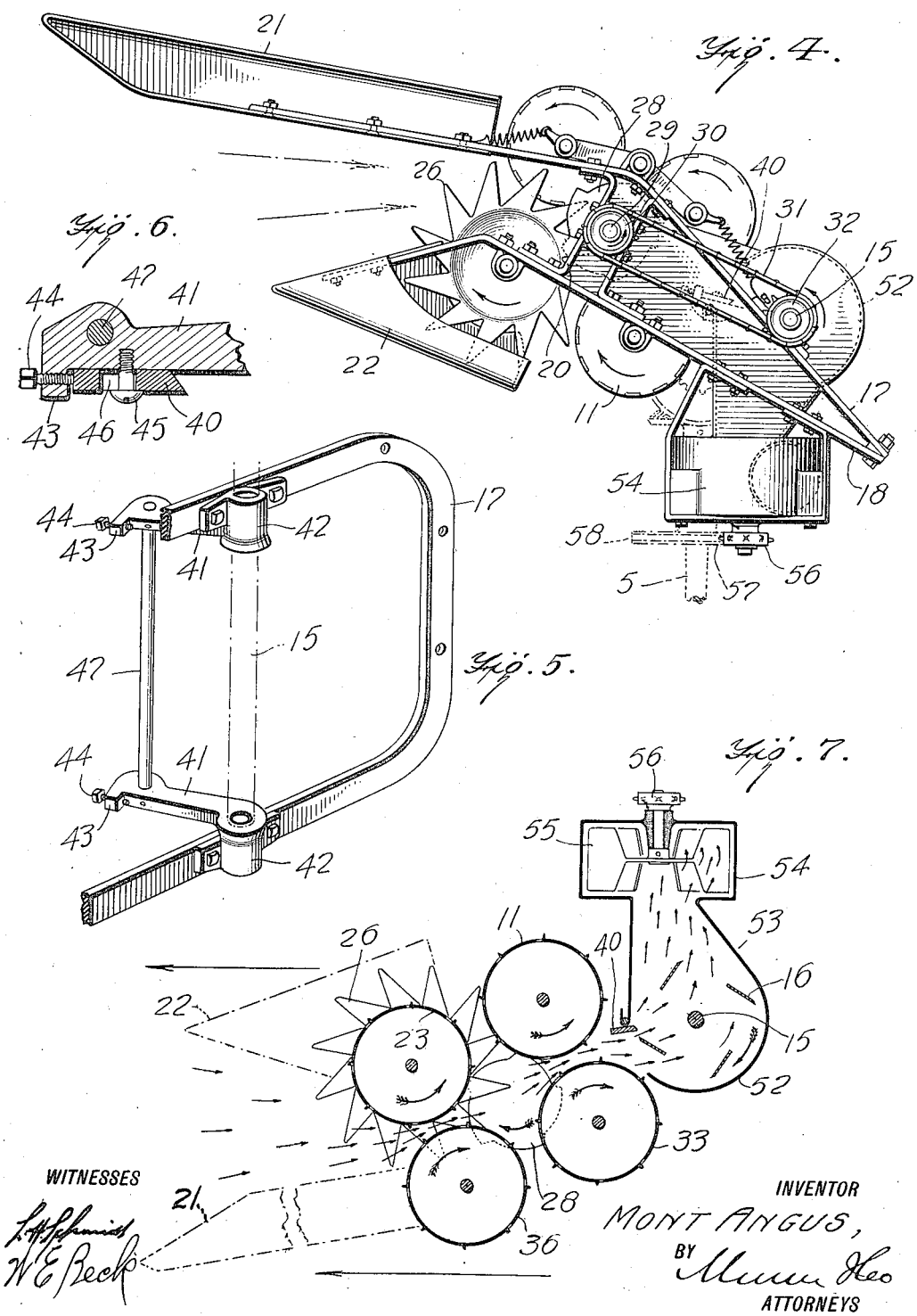

MONT ANGUS, OF TERRY, MONTANA.

ENSILAGE-HARVESTING MACHINE.

1,241,325.          Specification of Letters Patent.    Patented Sept. 25, 1917.

Application filed April 3, 1917. Serial No. 159,441.

*To all whom it may concern:*

Be it known that I, MONT ANGUS, a citizen of the United States, and a resident of Terry, in the county of Prairie and State of Montana, have invented certain new and useful Improvements in Ensilage-Harvesting Machines, of which the following is a specification.

The invention provides a machine embodying the novel features set forth more particularly hereinafter and finally claimed, designed to harvest fodder, prepare the same for storing, and automatically load the product into a wagon or like receptacle to be transported to a silo or other place of storage for keeping until required for use.

The invention contemplates the provision of improved stalk gathering mechanism for directing the stalks into the machine as the latter is propelled over the field; feeding mechanism for insuring the positive movement of the stalks through the machine to prevent choking or any impairment of the operation thereof; cutting mechanism for severing the stalks from the stubble and subdividing the stalks into short lengths; means for loading the stalks as they are cut, into a wagon or other suitable receptacle to be transported to a silo or other place of storage, and lastly to provide a machine which may be readily attached to any form of wagon or like appliance, and which is effective, positive and certain in operation, and not liable to derangement and compact in structure.

The invention consists of the novel features, details of construction and combinations of parts which hereinafter will be more fully described and subsequently claimed.

In the drawings hereto attached:

Figure 1 is a top plan view of an ensilage harvesting machine embodying the invention, showing the same attached to a wagon, a portion only of the latter being shown.

Fig. 2 is a detail section on the line 2—2 of Fig. 1 looking in the direction of the arrows, certain parts being omitted and other parts being indicated by dotted lines.

Fig. 3 is a side view of the machine.

Fig. 4 is a view of the machine as seen from the lower side.

Fig. 5 is a detail perspective view of a portion of the framework which receives the ensilage cutting mechanism.

Fig. 6 is a sectional detail on a larger scale, of one of the arms to which the fixed cutter of the ensilage cutting mechanism is attached.

Fig. 7 is a diagrammatic view, the arrows showing the direction of rotation of the operating parts and the path of travel of the stalks.

Corresponding and like parts are referred to in the following description and indicated in all the views of the drawings by the same reference characters.

In the embodiment of the invention illustrated in the drawings, the numeral 1 designates a wagon body or other container for receiving the stalks as they are delivered from the harvesting mechanism. The numeral 2 designates one of the wheels of the wagon or like receptacle. Beams 3 and 4 are secured to the wagon body or receptacle 1 in any convenient and substantial manner, and project laterally therefrom to receive the harvesting mechanism which is attached thereto and supported thereby in any desired way. A drive shaft 5 is mounted upon the wagon body or receptacle 1 and is adapted to be operated from any suitable source of power, not shown. The outer end of the drive shaft 5 is provided with a bevel gear 6 which is in mesh with a companion bevel gear 7 secured to the upper end of a stub shaft 8, mounted vertically in a member of the framework of the harvesting machine. The lower end of the stub shaft 8 is provided with a pinion 9 which is in mesh with a gear wheel 10 secured to the upper end of a drum 11. A sprocket gear 12 is secured to the shaft 8, and a sprocket chain 13 connects the sprocket gear 12 with a sprocket pinion 14 at the upper end of a shaft 15 on which is mounted a rotary cutter 16.

The framework of the harvesting machine comprises similar U-shaped members 17 and 18. The frame members 17 and 18 are forwardly diverged and are strengthened by means of interposed transverse braces 19 and 20. The forward ends of the members 17 and 18 are deflected, as indicated most clearly in Fig. 4, and receive guards 21 and 22. The deflected end portions receiving the guards 21 and 22, are flared (Figs. 1 and 4) to receive and direct the stalks into the machine as the latter is propelled over the field.

A drum 23 similar in structure to the drum 11, is disposed forwardly thereof and is provided with a gear wheel 24 which is connected by means of an idler pinion 25 with the gear wheel 10, with the result that both drums 11 and 23 are positively rotated at a uniform speed and in the same direction. A toothed wheel 26 is secured to the lower end of the drum 23 so as to rotate therewith, and the teeth of such wheel are adapted to operate across the inner contracted portion of the space 27 formed between the guards 21 and 22, so as to insure a positive movement of the stalks through said space. In the rear of the toothed wheel 26 is located a rotary cutter 28, the outer edge of which is toothed to make positive engagement with the stalks and prevent possible slipping thereof. The rotary cutter 28 is secured to the upper end of a short shaft 29 which is mounted vertically in the framework and is provided at its lower end with a sprocket wheel 30 connected by means of a sprocket chain 31 with the sprocket wheel 32 on the lower end of the shaft 15. The rotary cutter 28 is disposed at the inner end of the space 27 and coacts with the toothed wheel 26. The opposing faces of the toothed wheel 26 and rotary cutter 28, are in contact as indicated most clearly in Fig. 2, hence these elements coöperate by a shear action in severing the stalks.

A drum 33 is disposed opposite the drum 11 and coöperates therewith in the positive movement of the stalks through the machine. The drum 33 is mounted in arms 34 and contractile springs 35 coöperate with the arms 34 to press the drum 33 toward the drum 11 and admit of the drum 33 yielding to the variable bulk of the stalks passing through the machine when the latter is in operation. A drum 36 is disposed opposite the drum 23 to coöperate therewith, and is mounted in arms 37 which are yieldably drawn inward by means of contractile springs 38. The arms 34 and 37 are mounted upon a rod 39 which is vertically disposed opposite the space formed between the two drums 33 and 37. The arms 34 and 37 are provided in pairs, which are arranged above and below the drums 33 and 36 as indicated most clearly in Fig. 3, so as to receive the journals of the respective drums.

The drums 11 and 33 are toothed and preferably consist of cylinders having portions pressed outwardly therefrom to form teeth which engage positively with the stalks and move them through the machine. The several drums 11, 23, 36 and 33 are all of like formation and constitute the feeding mechanism whereby the stalks are caused to travel in a positive manner through the machine without any tendency to choke or impede the operation thereof.

The drums 11 and 23 are positively driven, whereas the drums 33 and 36 are indirectly driven from the drums 11 and 23 by means of interposed stalks.

The rotary cutter 16 may be of any construction and coöperates with a fixed cutter 40 which is attached at its ends to upper and lower arms 41. Each of the arms 41 is provided at its inner end with a hub 42 having ears which are bolted or otherwise secured to the respective upper and lower arms of the frame member 17. The hubs 42 receive the shaft 15 of the rotary cutter 16. The outer ends of the arms 41 are formed with projections 43 which receive adjusting screws 44. The fixed cutter 40 has a limited adjustment to allow for sharpening and variation in workmanship so that it may be set for effective coöperation with the guides or blades of the rotary cutter 16. Screws 45 pass through slots 46 formed in opposite end portions of the cutter 40 and secure the latter in the required adjusted position. A rod 47 connects the outer ends of the arms 41 and serves as bracing means therefor. The rotary cutter 16 is driven from the shaft 8 in the manner stated herein, and its shaft 15 being geared to the shaft 29 of the rotary cutter 28 imparts movement to the cutter 28 in the manner indicated.

A deflector 48 extends across the inner portion of the passage 27 and is supported by the upper arms of the frame members 17 and 18, being attached thereto in any way. This deflector 48 is arranged a short distance above the plane of the guards 21 and 22, and in practice bends the stalks forwardly at their upper ends, as indicated most clearly in Fig. 3, thereby causing the stalks to pass through the machine in an approximately horizontal position with their butts in advanced position, so that the ensilage cutting mechanism operates upon the stalks from butt to tip. The guards 21 and 22 are about in the plane of the lower ends of the several feed drums, whereas the deflector 48 is about in the plane of the upper ends of the feed drums.

The guard 50, which is arranged at some considerable distance above the plane of the guards 21 and 22 and in horizontal position, is supported by means of stays 51 which are connected at their lower end to the upper arms of the framework. The guard 50, while occupying a substantially horizontal position, as shown in Fig. 3, is inclined in an opposite direction to the guard 21 and extends across the passage 27. The purpose of guard 50 is to deflect the top portions of the stalks forward and to one side of the stalk rows, so as to insure the stalk properly entering to the space formed between the feed drum. The stalks bend downwardly slowly, thus allowing sufficient time for them to be drawn safely in between the drums before reaching below the plane of the lower end of the drum, and should some of the stalks fall they will be deflected over the guard 21 whereby to be supported by the same until they are drawn in between the feed drums.

The ensilage cutter comprising the rotary cutter 16 and fixed cutter 40, is inclosed by a casing 52 so as to confine the stalks when cut up into short lengths. The casing 52 is connected by means of a throat 53 with a casing 54, in which is arranged a fan 55 whose shaft is provided with a sprocket wheel 56 which is connected by means of a sprocket chain 57 with a sprocket wheel 58, secured to the shaft 5. A spout 59 connected with the casing 54 is adapted to deliver the product into the wagon body 1 or like receptacle.

In the operation of the machine, the same is attached to the body of the wagon or like parts so as to be carried thereby over the field. When the machine is in operation the shaft 50 is rotated to set in motion the several feed drums, cutting mechanisms and fan. During the travel of the machine it is directed so that the stalks will enter the passage 27. As the stalks reach the position to be cut from the stubble by means of the coöperating elements 26 and 28, their upper ends are bent forward by the action of the deflectors 48 and 50, as indicated in Fig. 3. The lower or butt ends of the stalks are caught between the advanced feed drums 23 and 36, and are moved rearwardly toward the ensilage cutting mechanism. When the stalks are cut from the stubble they assume an approximately horizontal position so as to advance with their butts foremost. The lower ends of the stalk as stated, are first caught between the feed drums 23 and 36 and are then cut from the stubble and are caught between the feed drums 11 and 33, and are advanced butt foremost to the ensilage cutting mechanism which reduces the stalks to short lengths, and the product is drawn through the casing 52 and throat 53 into the fan casing 54, and forced through the spout 59 into the wagon body or receptacle 1, and is transported thereby to a silo or other place of storage.

I claim:

1. In a machine of the character specified, guards disposed to form a flaring passage, feed drums arranged at the sides of the passage, each adapted to revolve about a vertically disposed axis, a rotary cutter in the rear of the feed drums and in the plane of their lower ends, a toothed wheel mounted on one of the feed drums and having its toothed portion disposed to operate across the passage and the space formed between the drums and over the rotary cutter to coact therewith.

2. In a harvesting machine of the character specified, feed drums arranged to revolve about vertically disposed axes, the one having a fixed axis and the other movable laterally, a rotary cutter in the rear of the feed drums and opposite the space formed between them, and a toothed wheel mounted on the drum having a fixed axis and having its toothed portion projecting to operate across the space formed between the drums and over the rotary cutter and in contact therewith.

3. In a harvesting machine of the character set forth, feed drums arranged to revolve about vertically disposed axes, a rotary cutter in the rear of the drums and in the plane of their lower ends, and a toothed wheel connected with the lower end of one of said drums to rotate therewith and having its toothed portion extending to operate across the space formed between the drums and over the rotary cutter, and in contact therewith.

4. In a harvesting machine of the character specified, a plurality of positively driven feed drums, each adapted to revolve about a vertically disposed axis, a corresponding number of indirectly operated centrally arranged feed drums, upper and lower swinging arms receiving the indirectly driven feed drums, and yieldable means normally acting upon the swinging arms to press the indirectly operated feed drums toward the positively operated feed drums.

5. A harvesting machine of the character specified comprising a stalk cutting mechanism, ensilage cutting mechanism arranged in the rear of the stalk cutting mechanism, vertically disposed feed drums intermediate and forward of the cutting mechanisms, means for directing the stalks between the advance feed drums, and a deflector for bending the stalks forwardly to cause them to pass longitudinally through the machine with their butts foremost.

6. In a harvesting machine of the character specified, vertically disposed feed drums, guards arranged in the plane of the lower ends of the feed drums and forwardly diverging to provide a passageway, a deflector disposed substantially in the plane of the upper ends of the feed drums and in advance thereof for bending the stalks forwardly at their upper ends, cutting mechanism at the inner end of the said passageway and in the rear of the deflector, and a guard arranged in a plane some distance above the feed drums and inclining across the passageway to deflect the stalks to one side of the stalk rows.

7. In a harvesting mechanism of the character set forth, a pair of U-shaped frames connected at their closed ends and forwardly diverging, the lower arms of such frames being oppositely deflected, guards carried by the deflected ends of the frames, sets of feed drums carried by the frames, a set of said drums being yieldable laterally, cutting mechanism for severing the stalks from the stubble and other cutting mechanism in the rear of the feed drums for cutting up the stalks into short lengths.

MONT ANGUS.

Witnesses:
W. A. CAMERON,
CLYDE S. CAMERON.